United States Patent
Mizuno (10) Patent No.: US 11,393,161 B2
(45) Date of Patent: Jul. 19, 2022

(54) HEAT MAP PRESENTATION DEVICE AND HEAT MAP PRESENTATION PROGRAM

(71) Applicant: Alpha Code Inc., Tokyo (JP)

(72) Inventor: Takuhiro Mizuno, Tokyo (JP)

(73) Assignee: Alpha Code Inc., Tokyo (JP)

( * ) Notice: Subject to any disclaimer, the term of this patent is extended or adjusted under 35 U.S.C. 154(b) by 0 days.

(21) Appl. No.: 15/734,249

(22) PCT Filed: Apr. 26, 2019

(86) PCT No.: PCT/JP2019/017861
§ 371 (c)(1),
(2) Date: Dec. 2, 2020

(87) PCT Pub. No.: WO2019/235106
PCT Pub. Date: Dec. 12, 2019

(65) Prior Publication Data
US 2021/0217223 A1    Jul. 15, 2021

(30) Foreign Application Priority Data
Jun. 6, 2018 (JP) .............................. JP2018-109078

(51) Int. Cl.
*G06T 15/20* (2011.01)
*G06F 3/01* (2006.01)
(Continued)

(52) U.S. Cl.
CPC .............. *G06T 15/20* (2013.01); *G06F 3/011* (2013.01); *G06T 19/003* (2013.01)

(58) Field of Classification Search
None
See application file for complete search history.

(56) References Cited

U.S. PATENT DOCUMENTS

| 9,727,669 B1* | 8/2017 | Wilson | G01C 21/165 |
| 2013/0101159 A1* | 4/2013 | Chao | G06K 9/00771 |
| | | | 382/103 |

(Continued)

FOREIGN PATENT DOCUMENTS

| JP | 2017-102564 A | 6/2017 |
| JP | 2017-529635 A | 10/2017 |

(Continued)

OTHER PUBLICATIONS

InstaVR, "Heat map analysis on where VR-experienced persons are focusing", Apr. 26, 2016.

(Continued)

*Primary Examiner* — Yingchun He
(74) *Attorney, Agent, or Firm* — Polsinelli PC (57) ABSTRACT

Provided is a heat map presentation device including: a creation factor detection unit 13 that detects the number of viewing times and viewing time by a viewer as a plurality of creation factors for a heat map for each of a plurality of regions obtained by dividing a three-dimensional image on the basis of a detection result of a region that the viewer is viewing in the three-dimensional image; and a heat map creation unit 14 that creates a heat map for a three-dimensional space on the basis of the plurality of creation factors which are detected. The heat map that is displayed in the three-dimensional space is created on the basis of the plurality of creation factors. It is possible to provide multi-dimensional information based on the plurality of creation factors by the heat map on the three-dimensional space having dimensions greater in comparison to a heat map in the related art which is displayed in a two-dimensional space.

10 Claims, 7 Drawing Sheets

(51) Int. Cl.
  *G06T 19/00* (2011.01)
  *G06Q 30/06* (2012.01)
  *G06F 3/0346* (2013.01)
  *G06Q 30/02* (2012.01)

(56) References Cited

U.S. PATENT DOCUMENTS

| | | |
|---|---|---|
| 2014/0257531 A1 | 9/2014 | McGreevy et al. |
| 2016/0300392 A1 | 10/2016 | Jonczyk et al. |
| 2017/0085964 A1 | 3/2017 | Chen |
| 2018/0165830 A1* | 6/2018 | Danieau ................. G06F 40/30 |
| 2019/0180480 A1* | 6/2019 | Gao ..................... G06T 11/001 |
| 2019/0253743 A1* | 8/2019 | Tanaka ................. H04N 21/812 |

FOREIGN PATENT DOCUMENTS

| | | |
|---|---|---|
| WO | WO 2015-192117 A1 | 12/2015 |
| WO | WO 2018-079166 A1 | 5/2018 |

OTHER PUBLICATIONS

European Search Report dated Jul. 27, 2021 issued in corresponding Patent Application No. 19814942.9 (10 pages).

* cited by examiner

HEAT MAP PRESENTATION DEVICE AND HEAT MAP PRESENTATION PROGRAM

CROSS REFERENCE TO RELATED APPLICATIONS

This application is a National Phase filing under 35 U.S.C. § 371 of PCT/JP2019/017861 filed on Apr. 26, 2019; which application in turn claims priority to Application No. 2018-109078 filed in Japan on Jun. 6, 2018. The entire contents of each application are hereby incorporated by reference.

TECHNICAL FIELD

The present invention relates to a heat map presentation device and a heat map presentation program, and particularly, a device that analyzes a viewing situation of a three-dimensional image by a viewer and presents the viewing situation as a heat map.

BACKGROUND ART

In recent years, utilization of a virtual reality (VR) technology, which allows a virtual world created in a computer to be experienced as if it is real, is spreading. The VR is roughly classified into VR that presents a user with a three-dimensional image created by using computer graphics and the like, and VR that processes a moving image obtained by photographing a real world into a moving image for VR and presents a user with a three-dimensional image that is created. As an example of the latter, there is also provided VR called a 360-degree moving image in which 360-degree all directions are allowed to be viewed in accordance with movement of a viewer's sight line.

Application examples of the VR are various, but it is typical that a user wears a head-mounted display (HMD) such as goggles and freely moves in a three-dimensional space drawn as a three-dimensional image with respect to the HMD by a computer to virtually have various experiences. An eyeglass-type or hat-type HMD may be used instead of the goggle-type HMD in some cases. The VR can present a user with a world that transcends real constraints of time and space.

A VR content has a characteristic in that a user can more freely select a viewing direction in comparison to an existing content. On the other hand, there is a problem that a developer does not know where to focus on creation and development of the VR content because the developer does not know where the user is viewing in the three-dimensional space. With regard to the problem, there is suggested a technology in which a user's gazing point on the VR content is analyzed and is displayed with a heat map (for example, refer to Non-Patent Document 1).

According to a technology called InstaVR described in Non-Patent Document 1, when a heat map analysis function is enabled, an application created by the InstaVR automatically collects information on the user's gazing point, and transmits the information to an analysis base of the InstaVR. It is described that a person who uses the InstaVR can understand a region viewed by the user and a movement sequence of the sight line with a heat map on a VR content edition screen on browser, and effective VR content creation or adjustment based on analysis results is possible.

Note that, also Patent Document 1 discloses that a position where a user gazes at in the VR content is detected and is displayed with a heat map (refer to claim 57, Paragraphs [0303], [0319], and the like). That is, in the VR system described in Patent Document 1, a position where the user gazes at a virtual reality content including a compressed stream of three-dimensional video data is detected, and a heat map including different colors is created on the basis of the number of user's gazing for every position (the number of users who view a specific position).

CITATION LIST

Patent Document

Patent Document 1: JP-T-2016-537903

Non-Patent Document

Non-Patent Document 1: "InstaVR" that analyzes where a person experiencing VR is viewing with a heat map, Apr. 26, 2016. https://japan.cnet.com/article/35081481/

SUMMARY OF THE INVENTION

Technical Problem

As described above, when a user's gazing point on the VR content is analyzed and is displayed with a heat map, it is possible to understand a region that a lot of users are viewing in the VR content. However, the heat map displayed in the related art is expressed by a two-dimensional image. Therefore, even when viewing the heat map created in this manner, there is a problem that only a position on the VR content which is frequently viewed by a user can be understood, and it is difficult to obtain further information.

The invention has been made to solve the problem, and an object thereof is to provide, with a heat map, multi-dimensional information on a user's viewing situation with respect to a three-dimensional image displayed as a VR content in a three-dimensional space.

Solution to Problem

To solve the problem, according to an aspect of the invention, the number of viewing times by a viewer and viewing time by the viewer are detected as a plurality of creation factors for a heat map for each of a plurality of regions obtained by dividing a three-dimensional image on the basis of visual observation region information obtained as a result of detecting a region that the viewer is viewing in the three-dimensional image displayed on a virtual three-dimensional space, a heat map for a three-dimensional space is created on the basis of the plurality of creation factors which are detected, and the heat map is displayed on the three-dimensional space.

Advantageous Effects of the Invention

As described above, according to the invention, a plurality of creation factors are used as a factor that is used when creating a heat map, and the heat map that is displayed on a three-dimensional space is created on the basis of the plurality of creation factors. According to this, with respect to a viewer's viewing situation for a three-dimensional image displayed in the three-dimensional space, it is possible to provide multi-dimensional information based on the plurality of creation factors by the heat map on the three-dimensional space having dimensions greater in comparison to a heat map in the related art which is displayed in a two-dimensional space.

MODE FOR CARRYING OUT THE INVENTION

Figure 1:
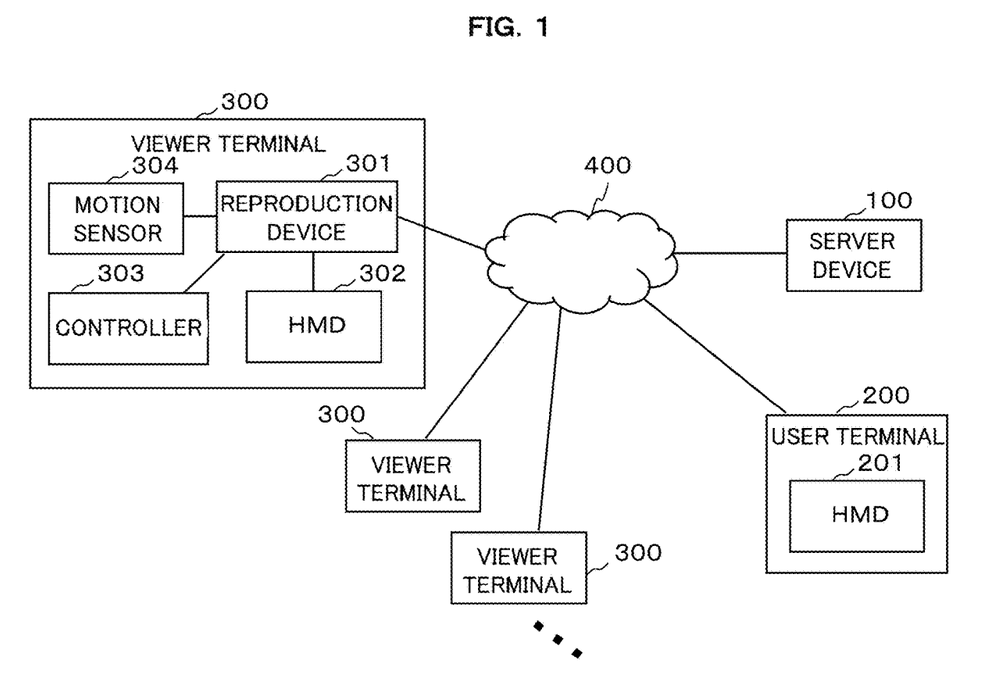
FIG. 1 is a view illustrating an overall configuration example of a VR viewing system to which a heat map presentation device according to an embodiment is applied.

Hereinafter, an embodiment of the invention will be described with reference to the accompanying drawings. FIG. 1 is a view illustrating an overall configuration example of a VR viewing system to which a heat map presentation device according to this embodiment is applied. As illustrated in FIG. 1, the VR viewing system of this embodiment includes a server device 100, a user terminal 200, and a plurality of viewer terminals 300. The user terminal 200 includes an HMD 201. Each of the viewer terminals 300 includes a reproduction device 301, an HMD 302, a controller 303, and a motion sensor 304. Note that, as described in the drawing, the reproduction device 301 and the HMD 302 may be configured as separate bodies, or both may be provided as one computer.

The reproduction device 301 and the server device 100 can be connected to each other through a communication network 400 such as the Internet and a mobile phone network. In addition, the user terminal 200 and the server device 100 can be connected to each other through the communication network 400. Although details will be described later, a heat map is created in the server device 100 on the basis of information indicating a viewing situation of the VR content by a viewer and movement of the viewer's body which are transmitted from the plurality of reproduction devices 301 to the server device 100. In addition, the heat map created in the server device 100 is presented to the user terminal 200. A user who uses the user terminal 200 is a developer of the VR content, and can create or adjust the VR content with reference to the presented heat map.

Each of the reproduction devices 301 reproduces a three-dimensional image as the VR content. The three-dimensional image is a parallax image for creating a virtual three-dimensional space of VR, and is a moving image of which content varies with the passage of time. For example, the three-dimensional image is called a 360-degree moving image in which 360-degree all directions are allowed to be viewed in accordance with movement of a viewer's sight line. The three-dimensional image reproduced by the reproduction device 301 is displayed by the HMD 302 worn by the viewer.

A gyro sensor or an acceleration sensor is mounted on the HMD 302 on which the three-dimensional image is displayed, and movement of the viewer's head can be detected. In addition, the reproduction device 301 controls reproduction of the three-dimensional image so that the three-dimensional space realized on display of the HMD 302 dynamically varies in correspondence with the movement of the viewer's head which is detected by the sensor of the HMD 302. That is, the reproduction device 301 reproduces the three-dimensional image in which a three-dimensional space on the front side widens when the viewer faces a front side, reproduces the three-dimensional image in which a three-dimensional space on the right side widens when the viewer faces a right side, and reproduces the three-dimensional image in which a three-dimensional space on the left side widens when the viewer faces a left side.

Figure 2:
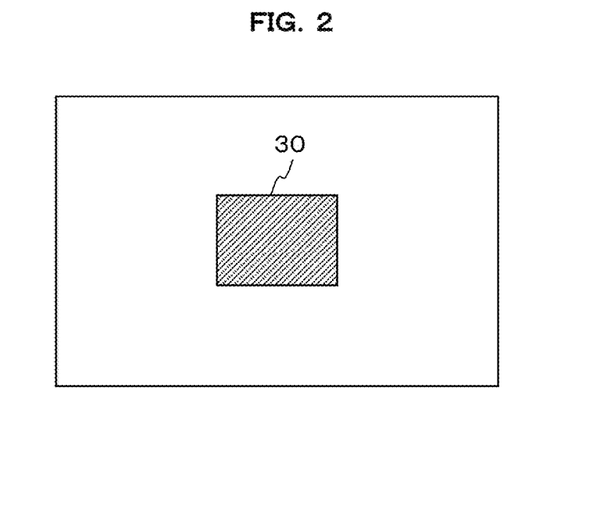
FIG. 2 is a view for describing an example of a method of detecting a visual observation region by a viewer.

The reproduction device 301 has a function of detecting a region viewed by the viewer in the three-dimensional image displayed on the virtual three-dimensional space. That is, as illustrated in FIG. 2, the reproduction device 301 detects a predetermined region set to a central portion of a display screen of the HMD 302 (hereinafter, referred to as "screen central region 30") as a visual observation region that the viewer is viewing. As described above, since the content displayed on the display screen of the HMD 302 varies in correspondence with movement of the viewer's head, a region that is actually displayed on the display screen in the entire three-dimensional image is a region that is selected and displayed by the viewer, and can be referred to as a region that the viewer is viewing.

Accordingly, the entire region displayed on the display screen of the HMD 302 may be detected as a visual observation region, but, particularly, the screen central region 30 set to the central portion of the display screen is detected as the visual observation region by the viewer in this embodiment. The reason for this is because the viewer is highly likely to pay attention to the screen central region 30 in the display screen of the HMD 302.

Note that, a sight line detection sensor may be mounted on the HMD 302 to detect an actual sight line of the viewer, and a region in a predetermined range in a direction of the sight line may be detected as the visual observation region by the viewer. For example, the size of the predetermined range may be set to the size of the screen central region 30. A camera that captures an image of viewer' eyes may be provided instead of the sight line detection sensor, and the captured image of the eyes may be subjected to image processing to detect the viewer's sight line. A unit that detects the viewer's sight line is not limited to the example, and another known unit may be used.

Here, it is preferable that a region of the three-dimensional image displayed on the screen central region 30 is detected as the visual observation region only when stoppage of head movement for certain time or longer (slight movement may be allowed) is detected by the sensor so that an image that is momentarily displayed on the screen central region 30 while the viewer is moving the head is not detected as the visual observation region by the viewer. Note that, in a case where slight head movement is allowed and stoppage of the head movement for certain time or longer is detected, the region of the three-dimensional image displayed on the screen central region 30 also slightly shakes for the certain time in correspondence with the head movement. In this case, for example, only an image portion that has been continuously displayed on the screen central region 30 for certain time, or only an image portion that has been displayed at a predetermined ratio or greater in the certain time may be detected as the visual observation region.

Even in the case of detecting the viewer's sight line, similarly, it is preferable that a region of the three-dimensional image displayed in a predetermined range in the sight line direction is detected as the visual observation region only when stoppage of sight line movement for certain time or longer (slight movement may be allowed) is detected by the sensor or the like so that a region through which the sight line momentarily passes while the viewer is moving the sight line is not detected as the visual observation region by the viewer. Note that, in a case where slight sight line movement is allowed and stoppage of the sight line for certain time or longer is detected, for example, only an image portion that has been continuously displayed as an image within a predetermined range for certain time, or only an image portion that has been displayed as the image within the predetermined range at a predetermined ratio or greater for the certain time may be detected as the visual observation region.

The viewer can give an instruction for the reproduction device 301 to execute given processing by operating the controller 303 during reproduction of the three-dimensional image. For example, in a case where an operable user interface is displayed in the three-dimensional image, the viewer can temporarily stop reproduction of the three-dimensional image, can enlarge and display a part (for example, a specific object included in the three-dimensional image) of content that has been displayed at the time of operation, or can pop-up display information related to the object by operating the user interface by the controller 303. Note that, the processing noted here is an example only, and another processing may be executed in correspondence with the operation on the user interface.

The motion sensor 304 is a sensor that is mounted on viewer's hands, legs, or the like, and detects movement of the user's body (hands or legs) during display of the three-dimensional image. Note that, movement of the user's head is detected by a sensor mounted on the HMD 302 as described above.

The reproduction device 301 transmits visual observation region information obtained as a result of detecting a region that the viewer is viewing in the three-dimensional image, and movement information obtained as a result of detecting movement of the viewer's body when the viewer is viewing a predetermined region during display of the three-dimensional image (movement information indicating head movement detected by the sensor of the HMD 302, or movement of hands or legs which is detected by the motion sensor 304) to the server device 100.

Here, the visual observation region information is information indicating the visual observation region of the viewer for every unit time obtained by time-dividing a three-dimensional image (moving image) that is time-series data at predetermined time intervals, and include a position of the visual observation region and time spent viewing the visual observation region. Duration of the unit time can be arbitrarily set. For example, one frame may be set as the unit time, or predetermined time including several frames may be set as the unit time. In addition, the movement information is information that is correlated with the visual observation region information. That is, the movement information is configured as information which can be identified that movement exists when the viewer is viewing which area.

Note that, the movement information is information that is used as information indicating that there is a reaction as body movement when the viewer views a certain region in a three-dimensional image. According to this, it is preferable that slight movement of the viewer is not transmitted to the server device 100 as the movement information, and only in a case where existence of movement of a predetermined magnitude or greater is detected by the sensor or the like, the movement information is transmitted to the server device 100. In addition, with regard to the hand movement, the movement information may be transmitted to the server device 100 only when detecting that the viewer operates the controller 303. In addition, with regard to the head movement, in order to distinguish the head movement indicating the reaction as the body movement from movement made to change a viewing range in which the viewer views the three-dimensional image, the movement information may be transmitted to the server device 100 only in the case of detecting predetermined head movement (for example, nodding movement, movement of tilting the head forward, and the like).

The server device 100 creates a heat map to be displayed in a three-dimensional space on the basis of the visual observation region information and the movement information which are transmitted from the plurality of viewer terminals 300. In addition, the server device 100 provides data of the created heat map to the user terminal 200 in correspondence with a request from the user terminal 200, and causes the HMD 201 to display the heat map.

Basically, the heat map created in this embodiment is map information showing which region in a three-dimensional image is being viewed by a plurality of viewers to what extent for every unit time obtained by time-dividing the three-dimension image that is time-series data, and a body movement reaction by the viewers has been performed to what extent when viewing which region. In addition, a heat map created in second and third embodiments to be described later is map information whose appearance varies in correspondence with a virtual standing position of the user who is viewing the heat map in the three-dimensional space in the user terminal 200. Hereinafter, details of a heat map creating process in the server device 100 will be described.

First Embodiment

Figure 3:
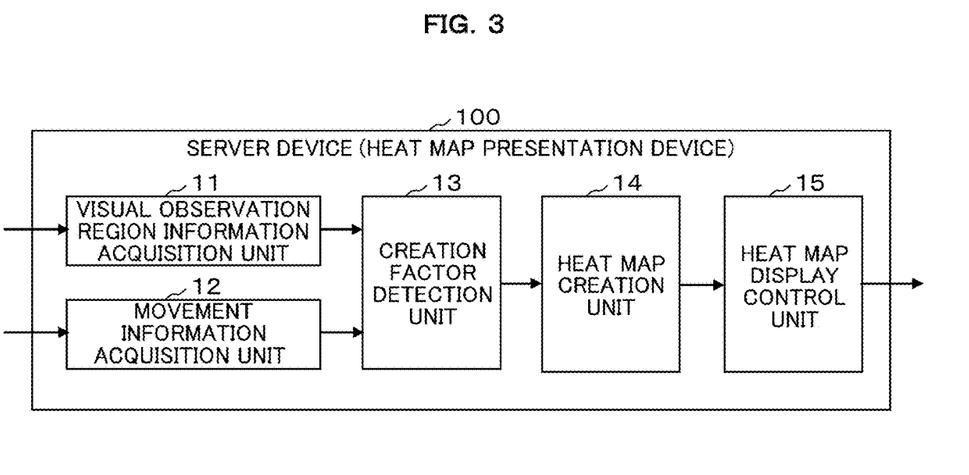
FIG. 3 is a block diagram illustrating a functional configuration example of a heat map presentation device according to a first embodiment.

FIG. 3 is a block diagram illustrating a functional configuration example of a heat map presentation device that is mounted on the server device 100 according to a first embodiment. As illustrated in FIG. 3, the heat map presentation device according to the first embodiment includes a visual observation region information acquisition unit 11, a movement information acquisition unit 12, a creation factor detection unit 13, a heat map creation unit 14, and a heat map display control unit 15 as functional configurations.

The respective functional blocks 11 to 15 may be configured by any of hardware, a digital signal processor (DSP), and software. For example, when being configured by software, the respective functional blocks 11 to 15 actually include a CPU, a RAM, a ROM, and the like of a computer, and are realized when a program stored in a recording medium such as the RAM, the ROM, a hard disk, and a semiconductor memory operates.

The visual observation region information acquisition unit 11 acquires visual observation region information from the plurality of viewer terminals 300 (reproduction devices 301). That is, the visual observation region information acquisition unit 11 acquires the visual observation region information obtained as a result of detecting a region that a viewer views in a three-dimensional image displayed on a virtual three-dimensional space from the plurality of viewer terminals 300, and stores the information. Note that, the reproduction device 301 of each of the viewer terminals 300 transmits the visual observation region information at a point of time when reproduction of the three-dimensional image is terminated to the server device 100, and the visual observation region information acquisition unit 11 acquires the information.

The movement information acquisition unit 12 acquires movement information from the plurality of viewer terminals 300 (reproduction devices 301). That is, the movement information acquisition unit 12 acquires the movement information obtained as a result of detecting movement of a viewer's body when the viewer views a desired region during display of the three-dimensional image from the plurality of viewer terminals 300, and stores the information. Note that, the reproduction device 301 of each of the viewer terminals 300 transmits the movement information at a point of time when reproduction of the three-dimensional image is terminated to the server device 100, and the movement information acquisition unit 12 acquires the information. Note that, for convenience of explanation, the visual observation region information acquisition unit 11 and the movement information acquisition unit 12 are distinguished, but the server device 100 may be provided with a function of receiving the visual observation region information and the movement information which are transmitted from the viewer terminal 300.

For each of a plurality of regions obtained by dividing the three-dimensional image on the basis of the visual observation region information acquired by the visual observation region information acquisition unit 11, the creation factor detection unit 13 detects the number of viewing times by the viewer and viewing time by the viewer as a creation factor for a heat map. In addition, with respect to a region that the viewer is viewing which is indicated by the visual observation region information, the creation factor detection unit 13 detects a movement situation of the viewer's body which is indicated by the movement information acquired by the movement information acquisition unit 12 as a creation factor for the heat map. In this manner, the creation factor detection unit 13 detects three factors including the number of times the region is viewed by the viewer, time for which the region is viewed by the viewer, and a movement situation of the viewer's body when the region is viewed as the heat map creation factors.

Figure 4:
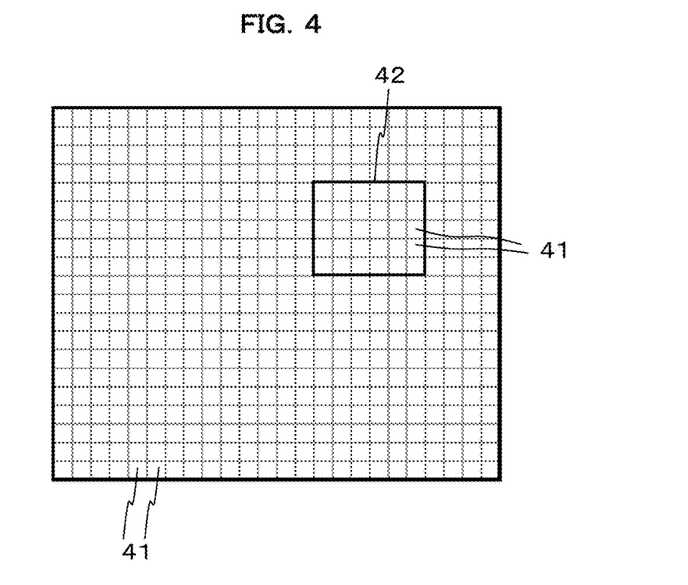
FIG. 4 is a view illustrating a plurality of divided regions which are used when creating a heat map.

Here, the plurality of regions obtained by dividing the three-dimensional image represent individual regions obtained by dividing the entirety of the three-dimensional image into a lattice shape. The size of the regions is set to be smaller than the size of the screen central region 30. FIG. 4 is a view illustrating a plurality of divided regions which are used when creating the heat map. As illustrated in FIG. 4, individual regions 41 obtained by dividing the entirety of the three-dimensional image into a lattice shape are a plurality of divided regions which are used when creating the heat map.

Note that, FIG. 4 illustrates a visual observation region 42 indicated by the visual observation region information transmitted from an arbitrary viewer terminal 300. The visual observation region 42 indicates a region that is visually observed by a viewer at one unit time, and the size is the same as the size of the screen central region 30 (however, in the case of detecting the visual observation region only in a case where head movement is stopped for certain time or longer, the visual observation region 42 is a smaller range than the screen central region 30 and not necessarily a rectangular region).

The number of times a certain region among the plurality of regions obtained by dividing the three-dimensional image is viewed by the viewer represents that the number of pieces of the visual observation region information indicating that the certain region is viewed among the visual observation region information transmitted from the plurality of viewer terminals 300. That is, the number of times the certain region is viewed by the viewer corresponds to the number of viewers who view the certain region.

For example, in the example illustrated in FIG. 4, the plurality of (30 pieces in the example illustrated in FIG. 4) divided regions 41 included in one piece of the visual observation region 42 relating to any one viewer are counted once as the number of viewing times by the viewer. Also with regard to another viewer, if visual observation of the same divided regions 41 is indicated by visual observation region information on the other viewer, the number of times the divided regions 41 are viewed by a viewer becomes two times. In this manner, for each of the plurality of regions 41 obtained by dividing the three-dimensional image, the number of viewing times by a viewer is counted on the basis of the plurality of pieces of visual observation region information acquired from the plurality of viewer terminals 300 by the visual observation region information acquisition unit 11, and the result is detected as one creation factor for the heat map.

In addition, among the plurality of regions obtained by dividing the three-dimensional image, time for which an arbitrary region is viewed by a viewer is total time for which the viewer views the divided region. For example, in the example illustrated in FIG. 4, if time for which any one viewer views the visual observation region 42 is two seconds, time for which the plurality of divided regions 41 included in the visual observation region 42 is viewed by the viewer is counted as two seconds. Also with regard to another viewer, if visual observation of the same divided region 41 is indicated by visual observation region information on the other viewer, and the visual observation time is three seconds, time for which the divided region 41 is viewed by the viewer is counted as a total of five seconds. In this manner, for each of the plurality of regions 41 obtained by dividing the three-dimensional image, the viewing time by a viewer is counted on the basis of the plurality of pieces of visual observation region information acquired from the plurality of viewer terminals 300 by the visual observation region information acquisition unit 11, and the result is detected as one creation factor for the heat map.

In addition, with respect to a region that a viewer is viewing as indicated by the visual observation region information, a movement situation of a viewer's body as indicated by the movement information is information indicating the number of times of moving any one of a head, hands, and legs by the viewer when the viewer is viewing an arbitrary region. That is, the movement situation of the viewer's body when a certain region is viewed by the viewer corresponds to the number of viewers who move any one of a head, hands, and legs when the certain region is viewed.

For example, in the example illustrated in FIG. 4, if existence of body movement when any one viewer is viewing the visual observation region 42 is indicated by the movement information, body movement of the viewer is counted once with respect to the plurality of divided regions 41 included in the visual observation region 42. Also with regard to another viewer, if existence of body movement when viewing the same divided region 41 is indicated by the movement information, with regard to the divided region 41, body movement of the viewer is counted as two times. In this manner, for each of the plurality of regions 41 obtained by dividing the three-dimensional image, the number of times of body movement of a viewer is counted on the basis of a plurality of pieces of movement information acquired from the plurality of viewer terminals 300 by the movement information acquisition unit 12, and the result is detected as one creation factor for the heat map.

The heat map creation unit 14 creates a heat map displayed on a three-dimensional space on the basis of a plurality of the creation factors detected by the creation factor detection unit 13. The heat map displayed on the three-dimensional space is map information that is displayed by determining a display mode corresponding to the visual observation situation and the body movement situation by the viewer for each of a plurality of unit times obtained by time-dividing the three-dimensional image displayed in the three-dimensional space, and for each of a plurality of regions obtained by spatially dividing the three-dimensional image.

In the first embodiment, the heat map creation unit 14 determines a display mode on the plane of the heat map on the basis of any one of a plurality of creation factors or a combination of the plurality of creation factors, determines a display mode on the depth of the heat map on the basis of the remainder of the plurality of creation factors, and creates the heat map on the basis of the determination content. For example, the heat map creation unit 14 determines the display mode of the heat map on the plane in correspondence with the number of viewing times and viewing time by the viewer, determines the display mode on the depth of the heat map in correspondence with the movement situation of the viewer's body, and creates the heat map on the basis of the determination content.

Examples of the display mode on the plane include the kind of display colors, a display concentration, the kind of display patterns, and the like. For example, the heat map creation unit 14 determines the display mode on the plane of the heat map by calculating a predetermined function value by using the number of viewing times and viewing time by the viewer and by determining the kind of display colors and the display concentration in correspondence with the magnitude of the function value for every divided region. In addition, examples of the display mode on the depth include perspective and thickness of the divided region, and the like. For example, on the basis of display in a case where the number of times of viewer's movement detected with respect to an arbitrary region is zero, the heat map creation unit 14 determines the display mode on the depth of the heat map so that as the number of times of movement is greater, the region is displayed to be seen as a near region or the region is displayed to be seen as a thick region.

Note that, a combination of the creation factor for determining the display mode on the plane and the creation factor for determining the display mode on the depth is not limited to the above-described example. For example, the display mode on the plane of the heat map may be determined on the basis of the number of viewing times by the viewer, and the display mode on the depth of the heat map may be determined on the basis of the viewing time by the viewer and the movement situation of the viewer's body. Alternatively, the display mode on the plane of the heat map may be determined on the basis of the movement situation of the viewer's body, and the display mode on the depth of the heat map may be determined on the basis of the number of viewing times and viewing time by the viewer. The other combinations may be employed.

The heat map display control unit 15 displays the heat map created by the heat map creation unit 14 on a three-dimensional space. Specifically, the heat map display control unit 15 causes the HMD 201 of the user terminal 200 to display the heat map created by the heat map creation unit 14 in correspondence with a display request transmitted from the user terminal 200. That is, the user terminal 200 transmits a display request for the heat map to the server device 100 to acquire heat map data from the server device 100, and causes the HMD 201 to display the heat map.

Here, the heat map display control unit 15 displays entire heat maps related to an entire region of the three-dimensional image developed to the three-dimensional space on the display screen of the HMD 201 of the user terminal 200. Alternatively, the heat map display control unit 15 displays a heat map corresponding to a partial region in the entire heat map corresponding to the entire region of the three-dimensional image on the display screen of the HMD 201, and may change a partial region extracted from the entire heat map in correspondence with head movement of a user who wears the HMD 201. That is, as in a three-dimensional image displayed on the HMD 302 of the viewer terminal 300, a direction of the heat map displayed on the HMD 201 may dynamically vary in correspondence with user's head movement detected by the sensor of the HMD 201.

As described above, the heat map is created for each of a plurality of unit times obtained by time-dividing the three-dimensional image displayed in the three-dimensional space. Accordingly, the heat map display control unit 15 displays a plurality of heat maps created for each unit time as a moving image while being sequentially switched.

Note that, a display method of the plurality of heat maps created for each unit time is not limited to the above-described example. For example, a user interface, which enables a desired unit time to be selected among a plurality of unit times from a reproduction initiation point of time to a reproduction termination point of time of the three-dimensional image, may be displayed, and only a heat map corresponding to the unit time selected through operation of the user interface can be selectively displayed in the user terminal 200.

As described above in detail, in the first embodiment, on the basis of visual observation region information obtained as a result of detecting a region that a user is viewing in the three-dimensional image, and movement information obtained as a result of detecting body movement of a viewer when the viewer is viewing a desired region during display of the three-dimensional image, for each of a plurality of regions obtained by dividing the three-dimensional image, the number of viewing times by the viewer, viewing time by the viewer, and a movement situation of the viewer's body are detected as a plurality of creation factors for the heat map, and the heat map for a three-dimensional space is created on the basis of the plurality of creation factors which are detected, and is displayed on the three-dimensional space.

According to the first embodiment configured as described above, a plurality of creation factors can be used as a factor that is used when creating the heat map, and a heat map that is displayed on the three-dimensional space is created on the basis of the plurality of creation factors. According to this, with respect to a viewing situation of a viewer for the three-dimensional image displayed on the three-dimensional space, it is possible to provide multi-dimensional information based on the plurality of creation factors by the heat map on the three-dimensional space having dimensions greater in comparison to a heat map in the related art which is displayed in a two-dimensional space.

Note that, in the embodiment, with regard to the creation factor that is used when creating the heat map, description has been given of an example using three creation factors including the number of viewing times by a viewer, viewing time by the viewer, and a movement situation of the viewer's body, but the invention is not limited to the example. For example, two creation factors including the number of viewing times and the viewing time by the viewer may be used as the creation factor. This is also true of a second embodiment and a third embodiment to be described below.

Second Embodiment

Figure 5:
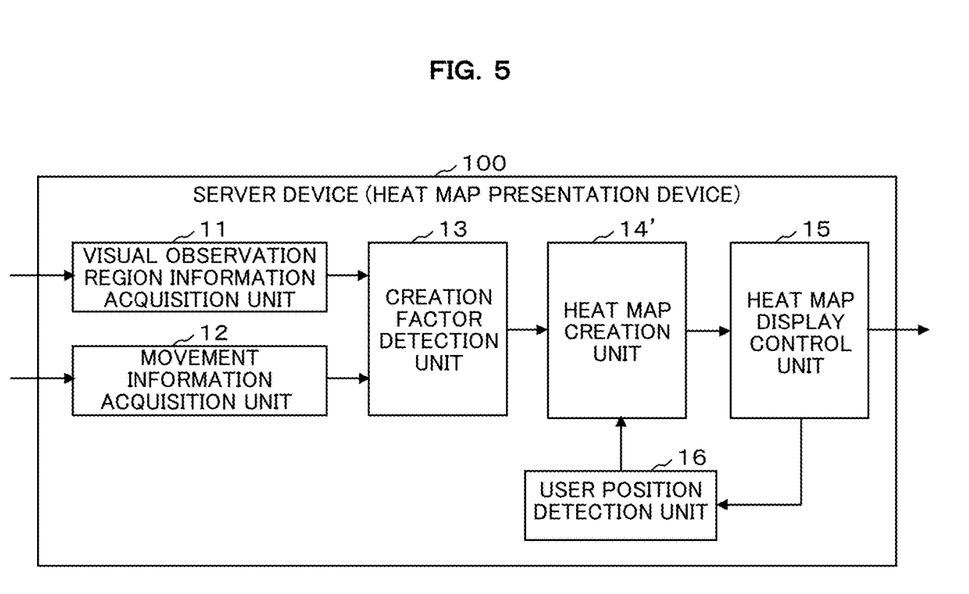
FIG. 5 is a block diagram illustrating a functional configuration example of a heat map presentation device according to a second embodiment.

Next, a second embodiment of the invention will be described with reference to the accompanying drawings. In the second embodiment, the overall configuration of the VR viewing system is similar to FIG. 1. FIG. 5 is a block diagram illustrating a functional configuration example of a heat map presentation device according to the second embodiment which is mounted on the server device 100. Note that, in FIG. 5, since a member to which the same reference numeral as the reference numeral in FIG. 3 is given has the same function, redundant description will be omitted here.

As illustrated in FIG. 5, the heat map presentation device according to the second embodiment further includes a user position detection unit 16 as a functional configuration. In addition, the heat map presentation device according to the second embodiment includes a heat map creation unit 14' instead of the heat map creation unit 14.

The user position detection unit 16 detects a user position indicating a virtual existing position of a user in a three-dimensional space in which a heat map is displayed on the HMD 201 of the user terminal 200 by the heat map display control unit 15. That is, in the user terminal 200, a virtual visual point position when viewing a heat map displayed on the HMD 201, that is, a user's existing position in the case of assuming that the user exists in the three-dimensional space can be arbitrarily changed in correspondence with user's operation on the user terminal 200.

When assuming that a position where the heat map is displayed in a three-dimensional space is fixed, the visual point position which can be arbitrarily changed as noted here is a visual point position in which at least one of a relative distance and a relative direction from the fixed position where the heat map is displayed is different. That is, the user can move the user's virtual existing position (virtual visual point position) in the three-dimensional space to be closer to the heat map or to be away from the heat map. In addition, the user can change the user's virtual existing position in the three-dimensional space to various directions other than a front side when viewed from the heat map.

The user terminal 200 transmits information indicating the virtual visual point position, that is, the user's virtual existing position to the server device 100. The user position detection unit 16 of the server device 100 acquires the user's existing position information from the user terminal 200 to detect a user position indicating the user's virtual existing position in the three-dimensional space.

The heat map creation unit 14' creates a heat map whose appearance is different in correspondence with a relative relationship between a user position in the three-dimensional space which is detected by the user position detection unit 16, and a map position (a fixed position where the heat map is displayed) indicating a virtual existing position of the heat map in the three-dimensional space. That is, the heat map creation unit 14' creates a wide-range heat map as a relative distance between the user position and the map position increases, and a narrow-range heat map as the relative distance between the user position and the map position decreases. In addition, in a case where a relative direction of the user position when viewed from the map position varies, the heat map creation unit 14' creates a heat map in a state of being viewed from the relative direction.

Figure 6:
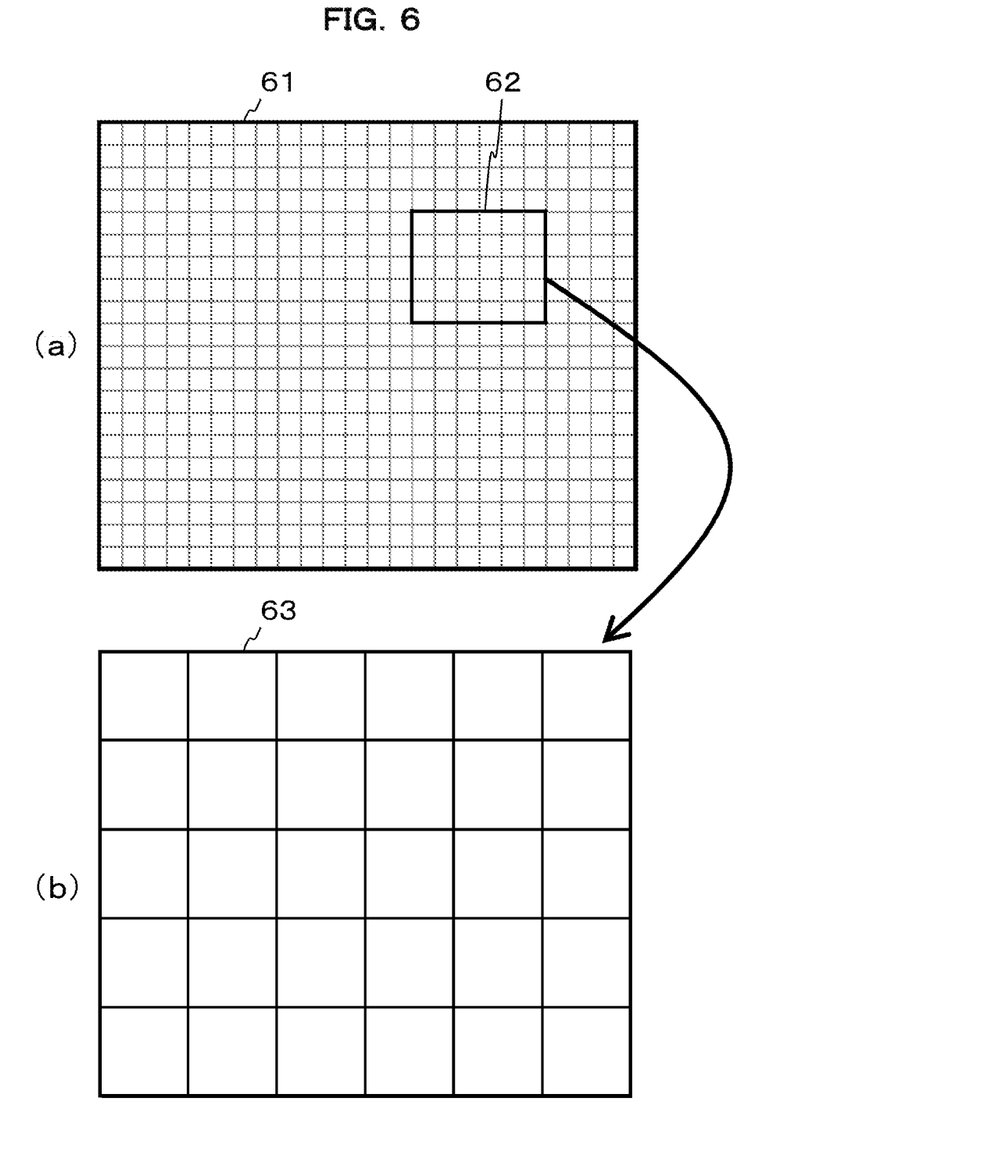
FIG. 6 is a view illustrating a heat map creation example according to the second embodiment.

FIG. 6 is a view illustrating a heat map creation example according to the second embodiment. FIG. 6(a) illustrates the wide-range heat map that is created in a case where the relative distance between the user position and the map position is long, and FIG. 6(b) illustrates the narrow-range heat map that is created in a case where the relative distance between the user position and the map position is short.

For example, a default position is determined as the user position, and a relative distance between the user position and the map position at the default position is set to be the greatest. That is, a virtual user position in the three-dimensional space is set to be arbitrarily changed between the default position where the relative distance between the user position and the map position becomes longest, and the map position where the relative distance between the user position and the map position becomes shortest (becomes zero).

With regard to a relative direction between the user position and the map position, the default user position is set to be a position in front of the central point of the heat map of the entire region. A virtual user position in the three-dimensional space can be arbitrarily changed within a display range of the heat map of the entire region.

In a case where existence of the user position at the default position is detected by the user position detection unit 16, the heat map creation unit 14' creates an entire heat map 61 relating to the entire region of the three-dimensional image that is developed in the three-dimensional space as illustrated in FIG. 6(a). According to this, the entire heat map 61 is displayed on the HMD 201 of the user terminal 200 by the heat map display control unit 15.

In a case where existence of the user position at a position closer to the map position side in relation to the default position is detected by the user position detection unit 16, the heat map creation unit 14' creates a heat map 63 in a range 62 narrowed in correspondence with a relative distance and a relative direction between the user position and the map position as illustrated in FIG. 6(b). The range 62 is set to a size corresponding to the relative distance in a state in which an intersection between a sight line and the heat map in the case of viewing a direction of the heat map from a moved user position is set as the center. According to this, the heat map 63 of the partial region 62 is displayed on the HMD 201 of the user terminal 200 in an enlarged mode by the heat map display control unit 15.

Note that, when displaying the heat map 61 of the entire region as in FIG. 6(a), the heat map is created with no consideration on the display mode on the depth, and only when displaying the heat map 63 of the partial region 62 in an enlarged manner as in FIG. 6(b), the heat map may be created in consideration of the display mode on the depth.

According to the second embodiment configured as described above, a display range of the heat map can be changed in correspondence with a virtual user position in the three-dimensional space set in correspondence with user's operation. That is, when the user position is set to a position far away from the display position of the heat map, a heat map of the entire region can be displayed. In addition, when the user position is made to be close to the display position of the heat map, a heat map of a partial region can be displayed in an enlarged manner. According to this, the heat map can be switched and displayed in conformity to a range desired to be confirmed by the user, and it is possible to easily confirm a viewing situation of the viewer for the three-dimensional image in correspondence with the intension of the user.

Third Embodiment

Figure 7:
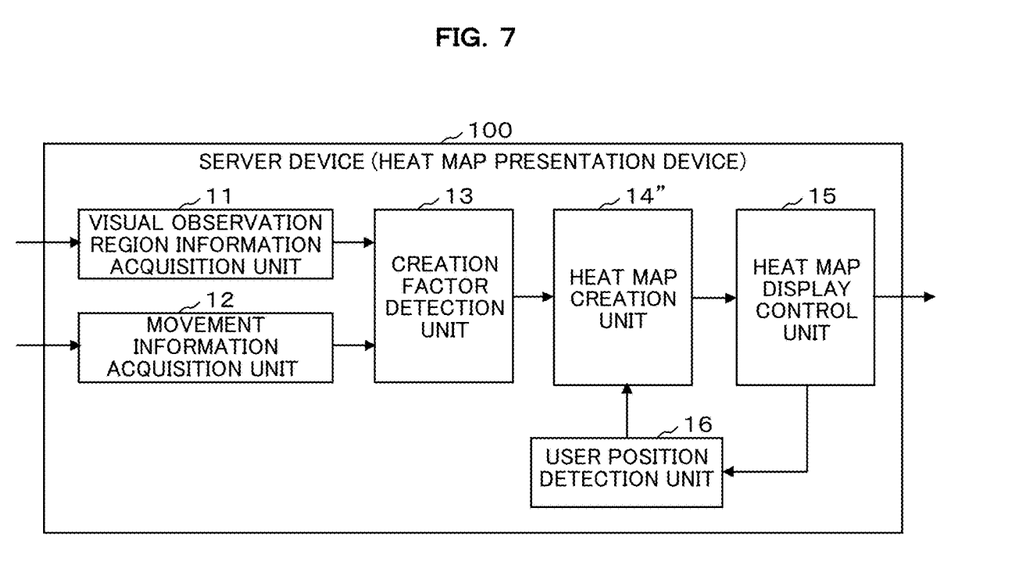
FIG. 7 is a block diagram illustrating a functional configuration example of a heat map presentation device according to a third embodiment.

Next, a third embodiment of the invention will be described with reference to the accompanying drawings. In the third embodiment, the overall configuration of the VR viewing system is similar to FIG. 1. FIG. 7 is a block diagram illustrating a functional configuration example of a heat map presentation device according to the third embodiment which is mounted on the server device 100. Note that, in FIG. 7, since a member to which the same reference numeral as the reference numeral in FIG. 5 is given has the same function, redundant description will be omitted here.

As illustrated in FIG. 7, the heat map presentation device according to the third embodiment includes a heat map creation unit 14" instead of the heat map creation unit 14' illustrated in FIG. 5. The heat map creation unit 14" creates a heat map by using any one or a plurality of creation factors among the plurality of creation factors detected by the creation factor detection unit 13 on the basis of a relative relationship between a user position in the three-dimensional space detected by the user position detection unit 16 and a map position indicating a virtual existing position of the heat map in the three-dimensional space.

For example, in a case where a relative distance between the user position and the map position is equal to or greater than a threshold value, the heat map creation unit 14" creates the heat map by using any one among the plurality of creation factors, or one function value that is calculated from the plurality of creation factors. In the case of creating the heat map by using any one among the plurality of creation factors, it is determined in advance that the heat map will be created by using which factor among the number of viewing times by the viewer, viewing time by the viewer, and a movement situation of the viewer's body. In addition, in the case of creating the heat map by using the one function value calculated from the plurality of creation factors, a function that uses the plurality of creation factors as a variable are set in advance, and the heat map is created by using a value that is calculated by the function.

In a case where the relative distance between the user position and the map position is less than the threshold value, the heat map creation unit 14" creates the heat map by using a plurality of creation factors among the plurality of creation factors or all of the creation factors as an individual creation factor. For example, when the relative distance between the user position and the map position is less than the threshold value and a heat map within a range narrowed from the entire region is created, the heat map creation unit 14" further plane-divides each of original divided regions of the three-dimensional image into a plurality of small regions, a display mode in which a plurality of creation factors among the plurality of creation factor or all of the creation factors are set as an element is determined with respect to each of the small regions, and the heat map is created on the basis of the determination content.

Figure 8:
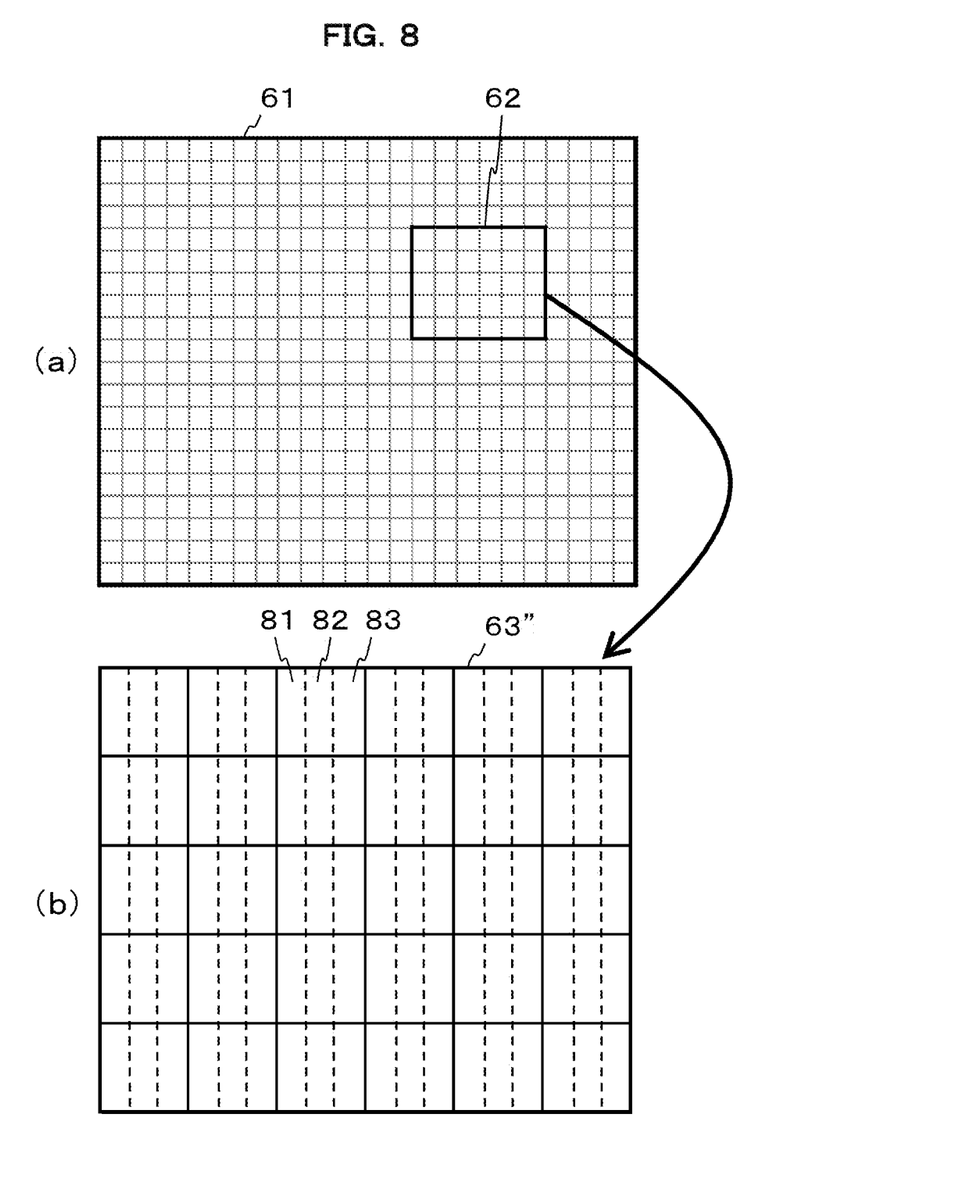
FIG. 8 is a view illustrating a heat map creation example according to the third embodiment.

FIG. 8 is a view illustrating a heat map creation example according to the third embodiment. FIG. 8(*a*) illustrates a wide-range heat map that is created in a case where the relative distance between the user position and the map position is equal to or greater than the threshold value, and FIG. 8(*b*) illustrates a narrow-range heat map that is created in a case where the relative distance between the user position and the map position is less than the threshold value. In FIG. 8, how to narrow the range 62 may be similar as in the second embodiment described with reference to FIG. 6.

The third embodiment is different from the second embodiment in a mode of the heat map that is created in a case where the relative distance between the user position and the map position is less than the threshold value as illustrated in FIG. 8(*b*). In the example illustrated in FIG. 8, the heat map creation unit 14" further plane-divides each of divided regions of a heat map 63" which are displayed in an enlarged manner with respect to the three-dimensional image range 62 into three small regions 81, 82, and 83, determines a display mode in which the number of viewing times by the viewer, viewing time by the viewer, and a movement situation of the viewer's body are set as an element with respect to each of the small regions 81, 82, and 83, and creates the heat map 63" on the basis of the determination content.

For example, with regard to a first small region 81, the following display mode is determined. Specifically, the number of viewing times by the viewer is set as the creation factor for the heat map 63", and a first display color (for example, red) is set to be variable in a concentration corresponding to the number of times of visual observation. In addition, with regard to a second small region 82, the following display mode is determined. Specifically, the viewing time by the viewer is set as the creation factor for the heat map 63", and a second display color (for example, blue) is set to be variable in a concentration corresponding to visual observation time. In addition, with regard to a third small region 83, the following display mode is determined. Specifically, the movement situation of the viewer's body is set as the creation factor for the heat map 63", and a third display color (for example, green) is set to be variable in a concentration corresponding to the number of times of movement.

In this manner, in a case where the virtual user position in the three-dimensional space approaches the map position and a heat map of a partial region is displayed in an enlarged manner, the enlarged divided region is further divided into a plurality of small regions. According to this, the heat map can be displayed in another mode from the viewpoint of a different creation factor. According to this, with respect to a viewer's viewing situation for the three-dimensional image displayed in the three-dimensional space, it is possible to provide a user with a multi-dimensional heat map in the case of individually considering the plurality of creation factors, and it is possible to analyze the viewer's viewing situation for the three-dimensional image in more detail.

Note that, when the heat map based on the display mode determined for each of the small regions 81 to 83 is displayed by the heat map display control unit 15, in a case where the user position further approaches the map position, and the relative distance between the user position and the map position becomes zero, the heat map creation unit 14" may create a heat map in a case where the user position is assumed to exist at a predetermined position in the three-dimensional space (for example, may be the default position, but there is no limitation thereto) by using only a creation factor corresponding to a small region in which the user position at that time exists.

Figure 9:
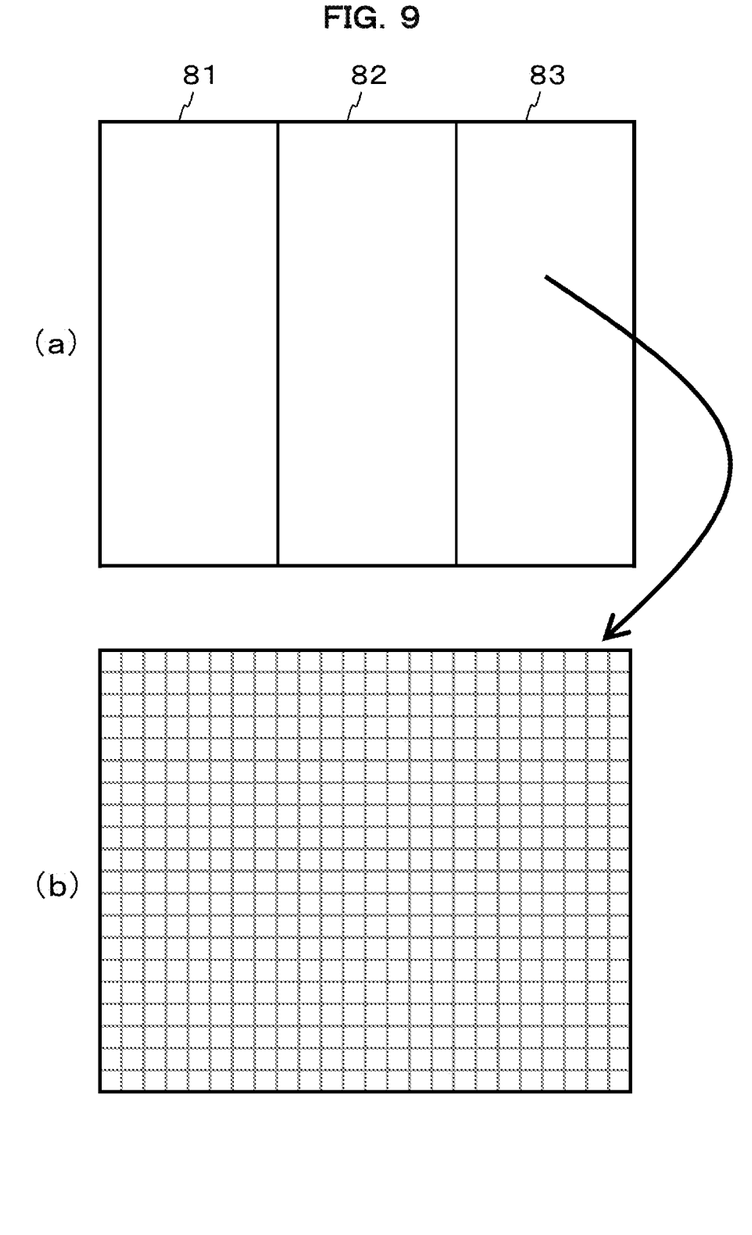
FIG. 9 is a view illustrating a heat map creation example in a case where a relative distance between a user position and a map position becomes zero in the third embodiment.

FIG. 9 is a view illustrating a heat map creation example in a case where the relative distance between the user position and the map position becomes zero. FIG. 9(a) illustrates a heat map that is created immediately before the relative distance between the user position and the map position becomes zero. In this case, the user position exists immediately in front of the map position, and a heat map corresponding to one divided region is displayed in an enlarged manner. That is, the heat map enters a state in which the small regions 81 to 83 which obtained by dividing the one divided region into three pieces are displayed.

In this state, in a case where a user selects any one among the small regions 81 to 83, and further approaches the region (a state in which the user enters the selected small region), the relative distance between the user position and the map position becomes zero. In this case, as illustrated in FIG. 9(b), the heat map creation unit 14" creates a heat map of the entire region in a case where the user position is assumed to exist at the default position on the three-dimensional space by using only a creation factor corresponding to a small region in which the user position where the relative distance becomes zero exists. The example in FIG. 9 illustrates a case where it enters the third small region 83 in which the movement situation of the viewer's body is set as a creation factor, and in this case, the heat map creation unit 14" creates a heat map of the entire region by setting only the body movement situation as the creation factor.

In this manner, among the three modes of heat maps displayed in a state of being divided into three small regions, in a case where a heat map of a creation factor that a user particularly desires to view exists, the relative distance between the user position and the map position may be set to zero by making the visual user position close to the map position, and by selecting a small region corresponding to a creation factor that is desired to view. According to this, dynamic switching into a heat map of a creation factor desired to view with focus can be made only by controlling the virtual user position in correspondence with desire of a user who analyzes a viewing situation of a viewer.

Note that, in the third embodiment, description has been given of an example in which one divided region is further divided into three small regions, but the one region may be divided into two small regions. For example, the heat map creation unit 14" can create a first heat map with respect to one small region by using a function value obtained from two creation factors as a creation factor, and can create a second heat map with respect to another one small region by using the remaining one creation factor.

In a case where the relative distance between the user position and the map position is less than the threshold value, the heat map creation unit 14" may determine a display mode on a plane and a display mode on a depth of the heat map, respectively, by using a plurality of creation factors among the plurality of creation factors or all of the creation factors, and may create a heat map on the basis of the determination content. For example, one divided region may be divided into two small regions, and with respect to two small regions, first and second heat maps may be created by respectively using two creation factors, and a depth may be provided to any one heat map by using the remaining one creation factor.

In the third embodiment, description has been given of an example in which heat maps for three small regions are created by using all of the three creation factors as individual creation factors, but heat maps for two small regions may be created by using arbitrary two creation factors among the three creation factors as individual creation factors. For example, two threshold values may be set for the relative distance between the user position and the map position, and heat maps for two small regions may be created when it approaches the map position from the default position where the relative distance is largest and the relative distance becomes less than a first threshold value, and heat maps for three small regions may be created when the relative distance becomes less than a second threshold value. In this case, two creation factors which are used for creating the heat maps for the two small regions may be determined in advance, or a user may arbitrarily set the creation factors.

In the first to third embodiments, description has been given of an example in which information on movement of a head, hands, and legs which is detected by a sensor is used as movement information on the body of a viewer, but the invention is not limited thereto. For example, movement of a body may be detected and may be used as the movement information. Alternatively, a heart rate or a pulse rate may be detected by a sensor, and these may be used as the movement information on the viewer's body. In addition, user operation on a user interface displayed in the three-dimensional image may be detected, and the user operation on the user interface may be used as the movement information of the viewer's body.

In addition, the above-described embodiments merely illustrate examples of embodiment when carrying out the invention, and the technical scope of the invention should not be interpreted in a limited manner. That is, the invention can be carried out in various aspects without departing from the gist or main characteristics thereof.

REFERENCE SIGNS LIST

11 Visual observation region information acquisition unit
12 Movement information acquisition unit
13 Creation factor detection unit
14, 14', 14" Heat map creation unit
15 Heat map display control unit
16 User position detection unit
100 Server device (heat map presentation device)
200 User terminal
300 Viewer terminal

The invention claimed is:

1. A heat map presentation device comprising:
a visual observation region information acquisition unit that acquires visual observation region information obtained as a result of detecting a region that a viewer is viewing in a three-dimensional image displayed on a virtual three-dimensional space of a head-mounted display;
a creation factor detection unit that detects a number of viewing times by the viewer and viewing time by the viewer as a plurality of creation factors for a heat map for each of a plurality of regions obtained by dividing the three-dimensional image on the basis of the visual observation region information;
a heat map creation unit that creates the heat map that is displayed on the three-dimensional space of the head-mounted display on the basis of the plurality of creation factors detected by the creation factor detection unit; and
a heat map display control unit that displays the heat map created by the heat map creation unit on the three-dimensional space of the head-mounted display, wherein the heat map creation unit determines a display mode on a plane of the heat map on the basis of one of the plurality of creation factors or a combination of the plurality of creation factors, determines the display mode on a depth of the heat map on the basis of a remaining creation factor among the plurality of creation factors, and creates the heat map on the basis of a determination content.

2. The heat map presentation device according to claim 1, further comprising:
a movement information acquisition unit that acquires movement information obtained as a result of detecting body movement of the viewer when the viewer is viewing a desired region during display of the three-dimensional image,
wherein the creation factor detection unit further detects a movement situation of the viewer's body which is indicated by the movement information as a creation factor for the heat map with respect to the region that the viewer is viewing which is indicated by the visual observation region information.

3. The heat map presentation device according to claim 2, further comprising:
a user position detection unit that detects a user position indicating a user's virtual existing position in the three-dimensional space in which the heat map is displayed by the heat map display control unit,
wherein the heat map creation unit creates the heat map according to a relative relationship between the user position in the three-dimensional space which is detected by the user position detection unit, and a map position indicating a virtual existing position of the heat map in the three-dimensional space.

4. The heat map presentation device according to claim 1, further comprising:
a user position detection unit that detects a user position indicating a user's virtual existing position in the three-dimensional space in which the heat map is displayed by the heat map display control unit,
wherein the heat map creation unit creates the heat map according to a relative relationship between the user position in the three-dimensional space which is detected by the user position detection unit, and a map position indicating a virtual existing position of the heat map in the three-dimensional space.

5. The heat map presentation device according to claim 4, wherein the heat map creation unit creates the heat map by using any one or a plurality of creation factors among the plurality of creation factors detected by the creation factor detection unit on the basis of a relative relationship between the user position in the three-dimensional space which is detected by the user position detection unit, and the map position indicating the virtual existing position of the heat map in the three-dimensional space.

6. The heat map presentation device according to claim 5, wherein in a case where a relative distance between the user position and the map position is equal to or greater than a threshold value, the heat map creation unit creates the heat map by using any one of the plurality of creation factors, or one function value calculated from the plurality of creation factors.

7. The heat map presentation device according to claim 6, wherein in a case where the relative distance between the user position and the map position is less than the threshold value, the heat map creation unit creates the heat map by using a plurality of creation factors among the plurality of creation factors, or all of the creation factors as an individual creation factor.

8. The heat map presentation device according to claim 7, wherein in a case where the relative distance between the user position and the map position is less than the threshold value, the heat map creation unit further plane-divides each of the plurality of divided regions into a plurality of small regions, determines the display mode in which a plurality of creation factors among the plurality of creation factors or all of the creation factors are set as an element with respect to each of the small regions, and creates the heat map on the basis of a determination content.

9. The heat map presentation device according to claim 8, wherein when the heat map based on the display mode determined for each of the small regions by the heat map creation unit is displayed by the heat map display control unit, in a case where the relative distance between the user position and the map position becomes zero, the heat map creation unit creates a heat map in a case where the user position is assumed to exist in a predetermined position on the three-dimensional space by using only a creation factor corresponding to a small region in which the user position at that time exists.

10. A non-transitory computer readable medium storing instructions which when executed by a processor cause the processor to perform operations comprising:
selecting a region that a user is viewing in a three-dimensional image displayed on a virtual three-dimensional space of a head-mounted display;
detecting a number of viewing times by the user and viewing time by the user as a plurality of creation factors for a heat map for each of regions obtained by dividing the three-dimensional image on the basis of a detection result by the selecting;
creating the heat map that is displayed on the three-dimensional space of the head-mounted display on the basis of the plurality of creation factors detected by the detecting; and
displaying the heat map on the three-dimensional space of the head-mounted display,
wherein the creating comprises:
determining a display mode on a plane of the heat map on the basis of one of the plurality of creation factors or a combination of the plurality of creation factors; and
determining the display mode on a depth of the heat map on the basis of a remaining creation factor among the plurality of creation factors.

* * * * *